(No Model.)
H. HOMMEL.
MEANS FOR CONNECTING GAS SUPPLY PIPES WITH BURNERS OF GAS STOVES.
No. 600,872. Patented Mar. 22, 1898.
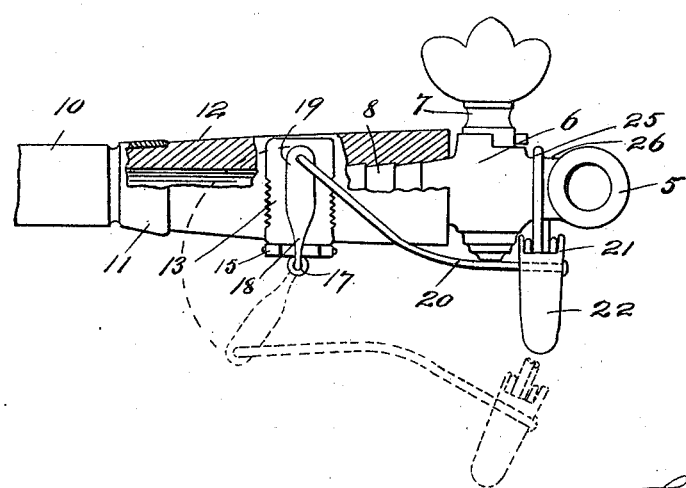
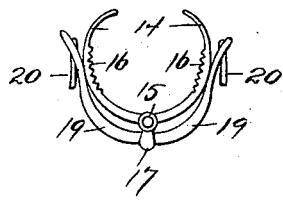
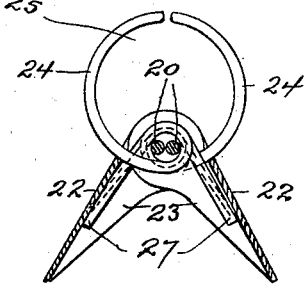
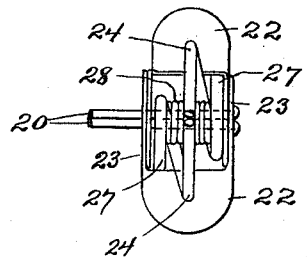
WITNESSES:
C. Vordfors
C. Gerst
INVENTOR
Helen Hommel.
BY
Edgar Tate & Co
ATTORNEYS.
THE NORRIS PETERS CO., PHOTO-LITHO., WASHINGTON, D. C.

UNITED STATES PATENT OFFICE.

HELEN HOMMEL, OF NEW YORK, N. Y.

MEANS FOR CONNECTING GAS-SUPPLY PIPES WITH BURNERS OF GAS-STOVES.

SPECIFICATION forming part of Letters Patent No. 600,872, dated March 22, 1898.

Application filed April 16, 1897. Serial No. 632,407. (No model.)

*To all whom it may concern:*

Be it known that I, HELEN HOMMEL, a citizen of the United States, residing at New York, in the county of New York and State of New York, have invented certain new and useful Improvements in Means for Connecting Gas-Supply Pipes with the Burners of Gas-Stoves, of which the following is a full and complete specification, such as will enable those skilled in the art to which it appertains to make and use the same.

This invention relates to means for connecting the stop cock or valve of a gas, gasolene, or similar stove with a gas-supply pipe; and the object thereof is to provide an improved device of this class by means of which the accidental separation of said parts will be prevented.

The invention is fully disclosed in the following specification, of which the accompanying drawings form a part, in which—

Figure 1 is a sectional side view of my improvement; Fig. 2, an end view of a detail of the construction; Fig. 3, an end view of another detail thereof, partly in section; and Fig. 4 a bottom plan view of the construction shown in Fig. 3.

In the drawings forming part of this specification the like parts of my improvement are designated by the same numerals of reference in each of the views, and in Fig. 1 I have shown at 5 a coupling-pipe which is adapted to be connected with the burner of a gas, gasolene, or other stove, and said pipe is provided at one side thereof with a valve-casing 6, in which is mounted a valve 7 of the usual form, and said valve-casing is provided on the side thereof opposite the pipe 5 with a nozzle 8, which is provided with a spiral thread or with spiral or circular grooves.

I have also shown at 10 a flexible or other tube by means of which connection is made with a gas-supply, and the tube 10 is provided at one end with a socket 11, and I also provide a tubular rubber coupling 12, which is cylindrical in cross-section and larger at one end than at the other, and the smaller end of which is adapted to be secured in the socket 11 of the tube 10 in any desired manner, and the nozzle 8 of the valve-casing 6 is inserted into or screwed into the larger end of the coupling 12 in the usual manner.

I also provide devices to prevent the separation of the valve-casing from the coupling 12, and these devices consist of a clamp 13, which is composed of two semicircular or segmental jaws 14, which are hinged together at 15 and provided with serrations or teeth 16 on their inner surfaces, and connected with the hinge at 15 is a depending ring or eye 17, through which is passed a spring-clamp 18, composed of two arms 19, which are adapted to clamp and hold the jaws 14 of the clamp 13 in connection with the coupling 12, this construction being best shown in Figs. 1 and 2, and pivotally connected with the upper ends of the arms 19 of the clamp 18 are curved rods 20, which are brought together beneath the valve-casing 6 and extended outwardly below the pipe 5, and mounted thereon is a clamp 21, consisting of two spring-operated jaws 22, which are pivoted on the ends of the rods 20 and which are provided with inwardly-directed side flanges 23, and wound on the rods 20 between the jaws 22 of the clamp 21 are two separate spring wires or rods 24, which are formed into a clamp 25, which is adapted to engage with the neck 26, by which the pipe 5 is connected with the valve-casing 6, and one end of each of the wires or rods 24 is projected downwardly within the separate jaws 22 of the clamp 21, as shown at 27, and wound around the rods 20 between the wires or rods 24 of the clamp 25 is a smaller spring 28, the ends of which also bear on the under sides of the jaws 22 of the clamp 21.

The operation will be readily understood from the foregoing description when taken in connection with the accompanying drawings and the following statement thereof.

This device is connected with the neck 26 of the pipe 5 and with the coupling 12, as shown in Fig. 1, and the arms 19 of the clamp 18 are turned upwardly, so as to press upon the jaws 14 of the clamp 13 and securely hold said jaws in connection with the coupling 12, and in this position of the parts the nozzle 8 of the valve-casing cannot become accidentally detached from said coupling 12, and whenever it is desired to disconnect the parts the arms 19 are turned downwardly into the position shown in dotted lines in Fig. 1, and in this operation the clamp 21 is detached from the neck 26 and the arms 19 of the clamp 18 are turned backwardly and downwardly, so that the jaws 14 of the clamp 13 may be disengaged from the said coupling 12, it being understood that the arms of the clamp 18 cannot be turned forwardly and downwardly on account of the coupling 12 being conical in form, whereby the forward end of the arm 14 is pressed outward to a greater extent than the rear end.

My improvement is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. The herein-described attachment for connecting the gas-supply pipe with the burner of a gas or other stove, consisting of a burner-pipe, a valve-casing connected therewith by means of a neck, and provided at the side opposite said pipe with a nozzle, a tubular coupling into which said nozzle is adapted to be inserted, and which is adapted to be connected with a gas-supply pipe, and means for preventing the separation of said nozzle from said coupling, consisting of a spring-operated clamp which is adapted to be connected with said neck, and another spring-operated clamp which is adapted to be connected with said coupling, said clamps being in operative connection by means of rods, substantially as shown and described.

2. The herein-described means for connecting a gas-supply pipe with the burner of a gas or other stove, comprising a coupling consisting of a pipe, a valve-casing connected therewith by means of a neck, a nozzle formed on said casing, a rubber coupling-tube into which said nozzle is adapted to be inserted, and which is adapted to be connected with said supply-pipe, and means for securing said parts together, consisting of a clamp which engages with said rubber tube, and another clamp which engages with said neck, said clamps being in operative connection, substantially as shown and described.

3. The herein-described device for connecting a gas-supply pipe with the coupling of the burner of a gas or other stove, said coupling being provided with a valve-casing at one side of which is a nozzle, and at the opposite side of which is a neck, said device consisting of a tubular rubber coupling, a clamp consisting of hinged jaws, which are adapted to engage with said rubber coupling, spring-arms pivotally connected therewith and adapted to embrace the same, another clamp which is adapted to engage with said neck and which is connected with said spring-arms by means of rods, substantially as shown and described.

4. The herein-described device for preventing the separation of the couplings by means of which the burner of a gas-stove is connected with the gas-supply pipe, said devices consisting of a clamp 13, composed of two jaws 14, pivotally connected together, spring clamp-arms 19 pivotally connected therewith and adapted to embrace the same, a clamp 21 adapted to engage the neck of the valve-casing, and rods 20 connecting the said clamp 21 with the spring-arm 19, substantially as shown and described.

In testimony that I claim the foregoing as my invention I have signed my name, in presence of the subscribing witnesses, this 14th day of April, 1897.

HELEN HOMMEL.

Witnesses:
C. GERST,
F. M. CARR.